Figure 5:
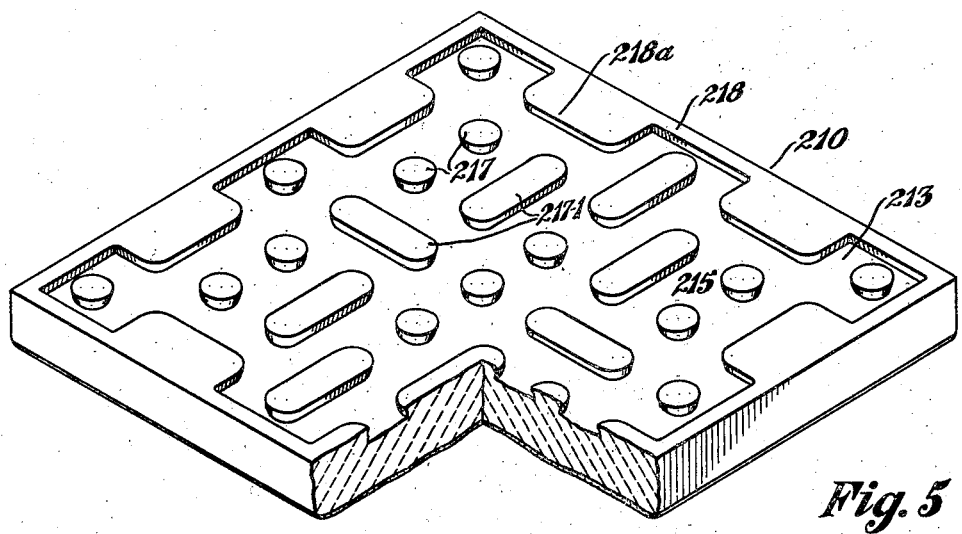

April 25, 1939.   H. R. FEICHTER   2,156,149
CERAMIC MANUFACTURE
Filed Jan. 14, 1938   2 Sheets-Sheet 1
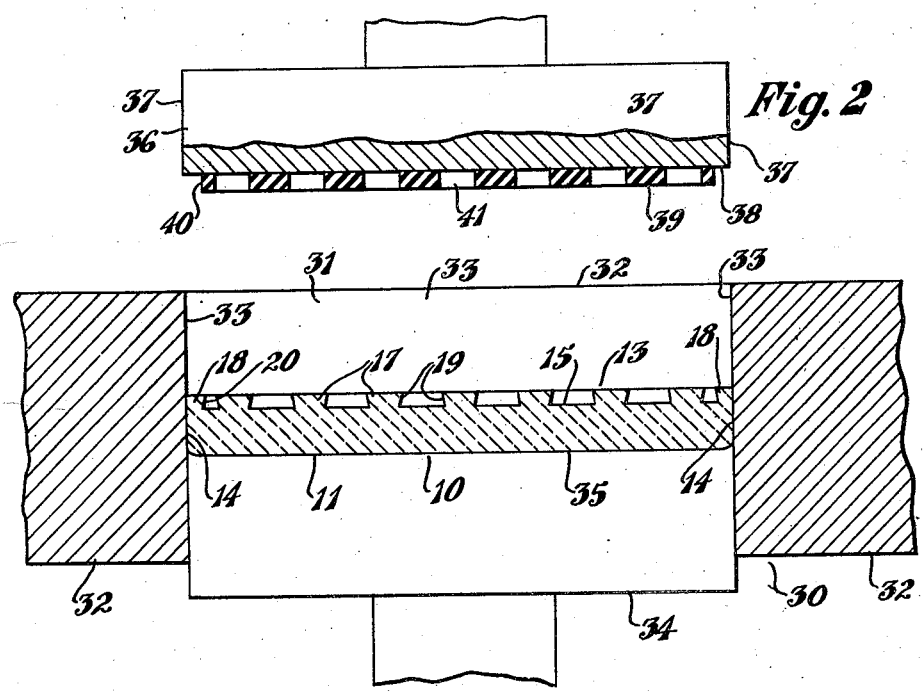
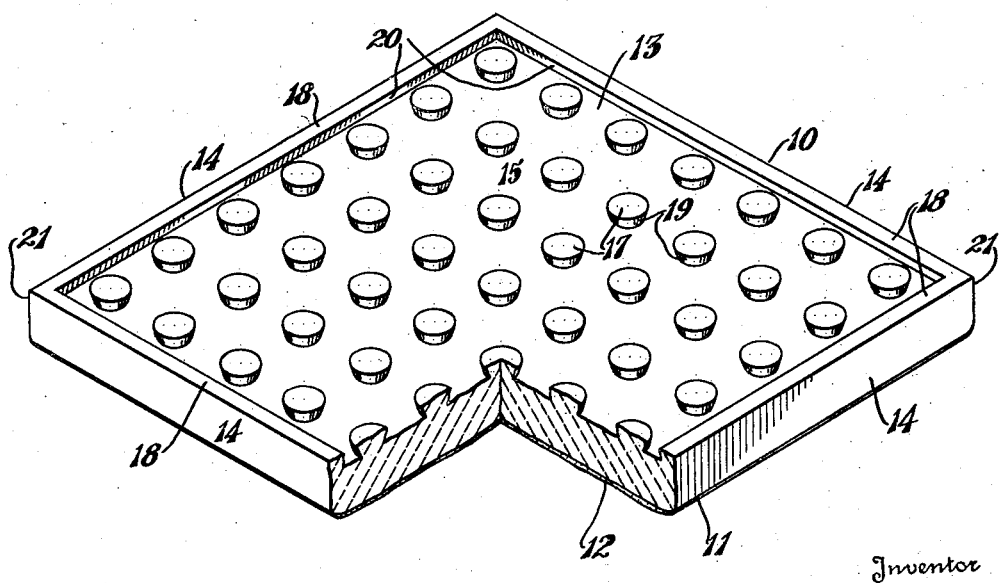
Fig. 1
Inventor
Harold R. Feichter
By Frease and Bishop
Attorneys Inventor
Harold R. Feichter
By Frease and Bishop
Attorneys Patented Apr. 25, 1939

2,156,149

UNITED STATES PATENT OFFICE 2,156,149

CERAMIC MANUFACTURE

Harold R. Feichter, Canton, Ohio, assignor to United States Quarry Tile Company, Canton, Ohio, a corporation of Delaware Application January 14, 1938, Serial No. 184,983

9 Claims. (Cl. 72—18)

The invention relates to ceramic articles of manufacture, preferably blocks, and from one standpoint to dry pressed ceramic articles having a limited gas content, and from another standpoint to ceramic articles having a back face and projecting members including portions projecting over portions of the back face to facilitate the bonding of the block with the material such as cement mortar used for setting such blocks, as in the form of tile, and to methods and apparatus for making such articles.

In dry pressed ceramic blocks as usually made, a damp ceramic dust mixture with about 6% to 8% water for bonding only is placed in a dry press apparatus in a pocket which may be formed by a metal die shell and a metal bottom die platten. A top metal dies platten may compress the ceramic dust mixture in the pocket to form the desired dry pressed ceramic block, which may be a tile, and the necessity of squeezing or compressing the air or gas content from the dust mixture in the pocket during the compression stroke of the top platten, limits the speed of the compression stroke, and thus the speed of forming the dry pressed ceramic block.

If the gas content of the dry pressed ceramic block is not sufficiently reduced by the forming thereof in the dry press, the formed block will be stratified by reason of thin layers of gas therein forming voids, and after the subsequent burning of the block, the same will be unsatisfactory and likely to rupture at the voids.

When the die members for dry pressing ceramic blocks are entirely metal, it has been determined that there is a limiting speed for the stroke of the pressure die member, in order to obtain satisfactory elimination of the gas content of the ceramic block being dry pressed.

From another standpoint, dry pressed tile are a ceramic block which are frequently desired, rather than extruded tile, particularly by architects, for example for use as floor and wall tile, where the tile must be uniform in shape within relatively restricted limits primarily for obtaining narrow joints between the tile after setting.

Tile having extremely uniform shapes may be made more economically by the dry press method than by the extrusion method.

In setting tile having flat back faces, adhesion only bonds the tile with the setting material, and in the case of relatively dense tile or relatively vitreous tile, adhesion cannot be depended upon to hold the tile in place after setting.

Consequently, in order to obtain proper bonding or engagement of the tile with the setting material, usually cement mortar, it is desirable that projecting members be provided on the back face of the tile which engages or bonds with the setting material, such projecting members having portions projecting over portions of the back face, so that mechanical engagement thereof with the setting material may be effected.

Such projecting members in the form of parallel rib ledges are relatively easy of formation by the extrusion process, but prior to the present improvements were considered impossible to produce by the dry press method in particular, or press methods in general.

Moreover, in usual tile having parallel rib ledges protruding from their back faces, the rib ledges, being parallel with each other, only engage the setting material laterally in directions at right angles to the ribs, and there is no engagement in directions parallel with the ribs.

Also, in usual square or rectangular tile having parallel rib ledges, the outermost ledges may serve to bond or engage the opposite parallel side faces or edges of the tile along which the ledges run, but the other two end or side faces of the tile are not engaged or sealed across their entire width, with the result that the engaging or sealing of the tile is not complete about all sides and/or ends thereof, and that there is danger of moisture leaking under the unbonded or unsealed ends or sides and damaging the bonding material beneath the set tile, and that cracking of the tile is likely to occur because of the relatively weak engagement with the setting material of the sides or ends in which the parallel ribs terminate.

The object of the present improvements includes the provision of a ceramic article, usually a block, preferably having a limited gas content, and having a back face provided with improved means for increasing the bonding or engagement of the block with the setting material and also preferably with improved means for completely engaging and sealing all the sides, or sides and ends of the block.

Further objects of the present improvements include the provision of an improved press method for producing among other articles the improved articles hereof, preferably a dry press method.

Further objects of the present improvement include the provision of improved apparatus for carrying out the improved methods hereof.

The foregoing and other objects are attained by the ceramic article of manufacture, and the methods, processes, steps, apparatus, combinations, and sub-combinations, which comprise the present invention, and the nature of which is set forth in the following general statement, and preferred embodiments of which together with their mode of use are set forth by way of example in the following description, and which are particularly and distinctly pointed out and set forth in the appended claims forming part hereof.

In general terms, the improved ceramic article or product of the present invention is preferably in the form of a block, which in the case of a tile, is usualy square or rectangular, and which may have a glazed front face which is exposed after setting, a back face which is bonded in the setting material, usually cement mortar, and polygonal side faces extending between the front face and back face.

According to the present improvements, the back face has formed thereon, preferably by the use of the improved method and improved apparatus hereof, a plurality of spaced projecting members which may be generally termed lugs and each having a portion projecting over a portion of the back face.

The projecting members or lugs may preferably include knobs, each with a peripheral portion projecting in differently angled lateral directions over a portion of the back face.

The preferred knobs may be frusto-conical, or may be elongated, and when elongated are preferably longitudinally at an angle with each other; and in any event the spaced knobs or lugs, each with a portion projecting over a portion of the back face, provide for bonding the tile in the setting material against displacement in any direction parallel with the back face thereof, or perpendicular thereto.

The improved blocks are furthermore preferably provided with additional projecting members or lugs which may be preferably a plurality of ledges, each having a portion projecting inwardly over a portion of the back face, and the ledges extending longitudinally cross-wise of the back face and being longitudinally angled with respect to each other.

The ledges are preferably adjacent the polygonal side faces of the tile, each ledge preferably extending the length of its adjacent side face, and thus the ledges preferably constitute border ledges.

The ledges furthermore are preferably provided for each side face of the tile, and are preferably end connected with each other, preferably at the corners of the block, whereby the back face of the block is engaged and sealed at all of its side edges or borders by the end connected border ledges, and the setting material.

The ledges are preferably spaced from the lugs or knobs.

In general terms, the improved method of the present invention includes in the manufacture of pressed articles, which may be ceramic articles, subjecting a mass of compressible material, preferably substantially dry ceramic material, to yielding compression forces which act upon portions only of the mass in the direction perpendicular to the reference plane, and which act upon the mass perpendicularly and also preferably laterally with respect to the reference plane, and then releasing the compressed mass from the action of the compression forces, thereby not only squeezing out and permitting the escape during squeezing of a substantial portion of the gas content of the mass, but providing for the formation upon the back face of the block into which the mass is formed of the desired projecting members or lugs having flaring portions projecting over portions of the back face of the block preferably in differently angled lateral directions.

In general terms, the improved apparatus of the present invention adapted for carrying out the improved method for making among other articles the improved articles or products hereof, includes in a usual press, which may be a ceramic dry press, relatively movable die members having opposed pressure faces and resilient material preferably in the form of a resilient sheet member, preferably a rubber sheet member, secured to and covering a portion of the pressure face of one of the die members, the rubber sheet member preferably having a plurality of apertures formed therein opening toward the opposed die member.

Figure 3:
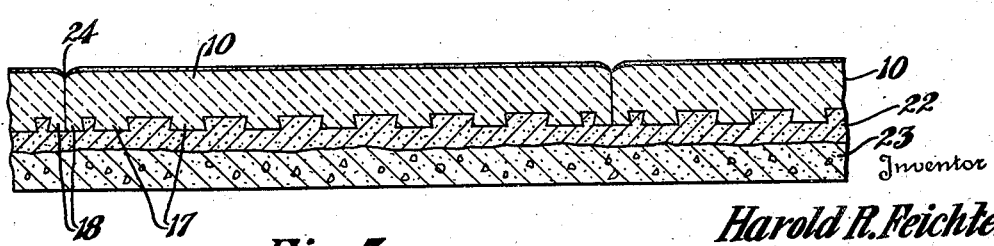

By way of example, several embodiments of the improved ceramic articles or products of the present invention, and one embodiment of the improved apparatus for carrying out the improved method for making among other articles the improved articles of the present invention are illustrated in the accompanying drawings forming part hereof; in which Figure 1 is a fragmentary isometric view looking at the back face thereof, of one embodiment of the improved ceramic article hereof in the form of a glazed tile;

Fig. 2, a fragmentary diagrammatic view with portions broken away and shown in section, illustrating one embodiment of the improved apparatus hereof for carrying out the improved method hereof;

Fig. 3, a transverse sectional view illustrating a plurality of the tile of Fig. 1, in place in setting material, as shown, cement mortar on a concrete base.

Figure 4:
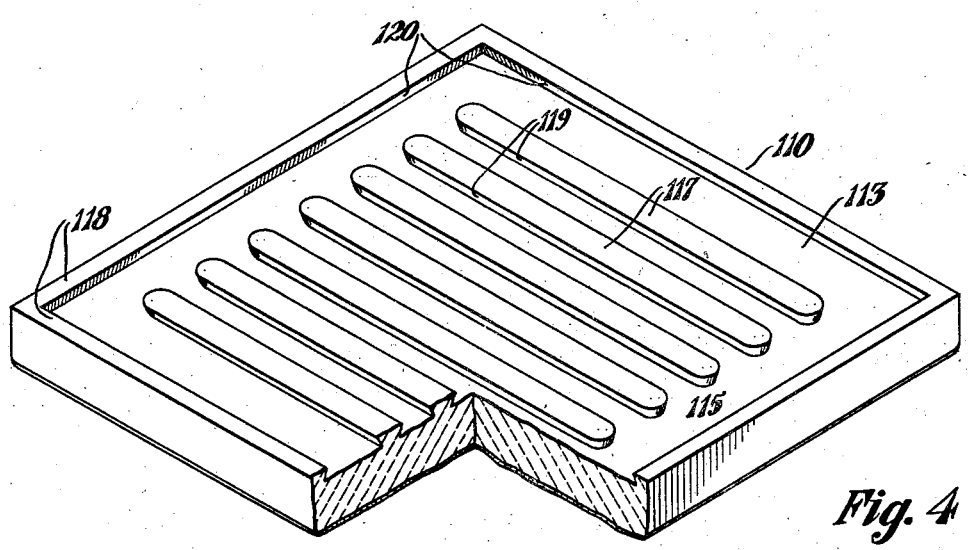

Fig. 4, a view similar to Fig. 1 illustrating a second embodiment of the improved ceramic article hereof, in the form of a glazed tile, and Fig. 5, a view similar to Figs. 1 and 4, illustrating a third embodiment of the improved ceramic article hereof in the form of a glazed tile.

Similar numerals refer to similar parts throughout the drawings.

One embodiment of the improved ceramic article or product of the present invention is illustrated in Fig. 1, and is indicated generally by 10, and as shown is a glazed tile made by the dry press method, including the present improvements as hereinafter set forth.

The tile 10 as shown is a ceramic slab or block having a front face 11 which is exposed in use and which as shown is provided with a finish glaze 12.

In addition to the front face 11 the tile 10 includes a back face 13, and polygonal side faces 14 extending between the front face 12 and the back face 13.

As shown, the front face 12 and the back face 13 of the tile 10 are square and equal in area, it being the usual practice to make the front and back faces of tile either square or rectangular, and the side faces 14 of the tile 10 are perpendicular to the front face 12 and the major plane surface 15 of the back face 13, and the side faces 14 as shown are rectangular.

The back face 13 includes the major plane surface 15 and projecting members or lugs 17 and 18 protruding from the plane surface 15, each projecting member 17 and 18 having a portion projecting over the adjacent portion of the plane surface 15 of the back face 13.

The specific form of the projecting members 17 shown are frusto-conical knobs having conical peripheral surface portions 19 flaring outwardly from and projecting over the plane surface 15 of the back face 13, laterally in differently angled directions. It is obvious that pyramidal knobs may also be utilized to provide peripheral surface portions projecting laterally in differently angled directions over the plane surface 15.

The knobs 17 are spaced from each other in each of the two right angled directions parallel with the side faces 14 of the tile 10.

The specific form of the projecting members or lugs 18 shown are longitudinally extending ledges, each extending longitudinally cross-wise of the back face 13, preferably parallel with, adjacent to, and in part continuing from one of the side faces 14. The ledges 18 are each provided with an angled face portion 20 projecting inwardly over the adjacent portion of the plane surface 15 and angled acutely with respect thereto.

The ledges 18 thus constitute border ledges for the tile 10 and are preferably end connected with each other at the corners 21 of the tile 10 and are preferably provided for each side face 14 of the tile.

The ledges 18 are also preferably spaced from the knobs 17.

In Fig. 3, a plurality of the tile 10 are illustrated after being set in setting material such as cement mortar 22 upon a concrete base 23.

The tile 10 are formed by the improved method and apparatus hereinafter set forth, as applied in the dry press manufacture of ceramic articles, and the tile 10 are all extremely accurate in shape, and the joints 24 between the tile 10 may thus be very narrow.

As clearly shown in Fig. 3, the setting material 22 interlocks or engages with the projecting members or lugs of the tile 10, that is, the knobs 17 and the ledges 18, thereby anchoring the tile 10 against displacement in any direction parallel with the plane surface 15 of the back face 13, or perpendicular thereto.

Moreover, the end connected border ledges 18 engage and seal each tile 10 around all the sides thereof, and thus effectually seal the setting material within the border ledges from water leakage, such as occurs when there is no sealing around the sides of a tile.

Moreover, the improved tile 10 have a very great bonding strength with the setting material, which may be as high as 15,000 lbs. shearing strength over the tile area of a 16 sq. in. tile, which ordinarily does not have a shearing strength over 1000 lbs; and the shearing strength of the improved tile 10 is substantially equal to the breaking point of the mortar cement used to set the same.

Moreover, the mechanical engagement of the setting material with all the sides of the tile, substantially reduces the breakage which occurs when only two opposite sides of the tile are engaged.

In Fig. 4 is illustrated a second embodiment of the improved ceramic article or product of the present invention, which is indicated generally by 110, and which is a tile, generally similar to the tile 10, but in the tile 110 there are provided elongated knobs or lugs 117, which are parallel with each other and spaced from each other sidewise, and spaced from the border ledges 118 endwise and side-wise, the knobs 117 and the border ledges 118 each having projecting portions in the form of angled surfaces 119 and 120 which project over adjacent portions of the plane surface portion 115 of the back face 113.

In Fig. 5, is illustrated a third embodiment of the improved ceramic product of the present invention which is indicated generally by 210, and which is a tile generally similar to the tile 10 and 110, but in the tile 210, there are provided frusto-conical knobs 217 and elongated lugs or knobs 217-1. The knobs 217 and 217-1 are spaced from each other in the two right angled directions parallel with the side faces of the tile 210, and the elongated knobs 217-1 are also angled with respect to each other. Moreover, in the tile 210, the border ledges 218 include tongue portions 218a which project toward each other from the opposite border ledges.

The knobs 217 and 217-1 and the border ledges 218 each have projecting angled surface portions extending over adjacent portions of the plane surface portion 215 of the back face 213 of the tile 210, in a manner similar to the projecting surface portions of the tile 10 and 110.

The tile 10, 110, and 210, as above set forth may be produced by the improved method and apparatus hereinafter described in detail, and the present inventor knows of no other method for press forming the projecting members, so that the projecting portions thereof are angled acutely with respect to the plane surface of the back face of the tile, and project laterally in differently angled directions over the plane surface, either on the same projecting member, or on different spaced or different spaced and longitudinally angled projecting members.

The improved method of the present invention includes, subjecting a mass of compressible material to yielding compression forces which act upon portions only of the mass in one reference plane in directions perpendicular and preferably laterally with respect to the reference plane. After the application of the yielding compression forces, the mass is released from the application of the compression forces.

In utilizing the improved method in ceramic manufacture, by thus forming a mass of preferably dry ceramic material by the use of yielding perpendicular and preferably lateral compression forces, not only is it possible to form the desired spaced and/or angled projecting members with projecting portions which are angled to a plane back surface and which may be peripheral, but also a substantial amount of the gas content of the ceramic mass is squeezed out and permitted to escape much more rapidly, than when a mass of ceramic material is compressed between unyielding forces, whereby the speed of forming the articles, preferably from substantially dry ceramic dust mixtures is substantially increased by the present improved method as compared with the speed of forming the same by the use of non-yielding compression forces.

The improved method hereof may be carried out by the use of the improved apparatus of the present invention, one embodiment of which is illustrated diagrammatically in Fig. 2, and is indicated generally by 30.

The apparatus 30 includes die members forming a die pocket 31, and the die pocket forming members may be rigid metal shell members 32 having inner side faces 33, forming a square or rectangular opening in which fits a bottom die platten member 34 having an upper pressure face 35. The bottom die platten member 34 may be movable by reciprocation into and out of the opening of the shell members 32 to form the bottom of the die pocket 31 by the upper pressure face 35 of the bottom die member 34 and the inner surfaces of the shell members 32.

An upper die platten member 36 is movable as by reciprocation into the die pocket 31, the upper die member 36 having side faces 37 fitting the side faces 33 of the die pocket 31, and a lower pressure face 38 opposite the upper pressure face 35 of the lower die member 34.

The upper die member 36 and the lower die member 34 are preferably metal and are thus substantially rigid.

A sheet of resilient material 39, preferably sheet rubber material, is secured upon the lower pressure face 38 of the upper die platten member 36. The resilient sheet member 39 may be secured to the upper rigid die member 36 as by glue or by other means.

The resilient sheet member 39 covers a portion only of the surface of the pressure face 38 of the upper die platten member 36, the resilient sheet member 39 having side faces 40 which are perpendicular to the lower plane pressure face 38 of the upper die member 36. The resilient sheet member 39 also has formed therein a plurality of apertures 41 which are spaced from each other, and which as shown in the apparatus 30 are cylindric when the sheet member 39 is uncompressed, the resilient member 39 as shown in Fig. 2 being shaped to form successively the frusto-conical lugs 17 and the ledges 18 of the improved blocks 10.

In using the apparatus 30 to carry out the improved method hereof, a mass of compressible material is placed in the die pocket 31; and in the manufacture of ceramic blocks by the dry press method, the compressible material may be a substantially dry ceramic dust mixture, with a 6% to 8% water content.

The die shell members 32 and the lower die platten member 34 are maintained stationary with the mass of ceramic material in the pocket 31 thereof, and the upper die platten member 36 is moved under pressure into the die pocket, and the resilient sheet member 39 secured upon the pressure face 38 of the upper die platten member 36 yieldingly impinges the upper portion of the mass of ceramic material in the die pocket 31; and upon further advancing of the upper die platten member 36 towards the lower die platten member 34, the resilient sheet member 39 becomes distorted and applies yielding compression forces upon the mass of ceramic material not only in a direction perpendicular to the reference plane 38, but also laterally with respect to the reference plane 38, the side faces 40 of the resilient member 39 and the cylindric faces of the apertures 41 therein becoming angled with respect to the reference plane or compression face 38 of the rigid metal platten 36, and forming respectively the angled faces 20 of the ledges 18 and the angled faces 19 of the lugs 17 of the tile 10, the upper faces of which are formed by the rigid pressure face 38 of the upper die platten member 36.

The mass of material in the die pocket is then released from the pressure of the die members, by withdrawing the upper die platten member 36 from the die pocket 31, whereby the resilient sheet member 39 resumes its shape as shown in the withdrawn position of Fig. 2, and clearance is provided for permitting removal of the same from between the formed ledges 18 and lugs 17 with the overhanging angled projecting faces 20 and 19 thereof.

The articles thus formed by carrying out the improved method hereof on the improved apparatus hereof, may be subject to further usual manufacturing steps.

For example, in Fig. 2, the improved apparatus 30 is illustrated as arranged for forming the ceramic block 10, which after forming is subject to other steps of tile manufacture, which may include drying, glazing, and burning.

By providing suitably shaped sheet members for the apparatus 30, the tile 110, 210, or other similar tile may be formed thereon.

The application of the yielding pressures as above described by the resilient preferably rubber sheet member upon the rigid die member of the improved apparatus, provides for a relatively rapid squeezing out of gas content of the dry ceramic mixture being formed between the opposed pressure faces of the die members of the improved apparatus.

Each of the embodiments 10, 110, and 210 of the improved article or product, and the embodiment 30 of the improved apparatus of the present invention, are illustrated and described herein by way of example, and the scope of the present invention is not limited to the same or to the particular details thereof, but is commensurate with any and all novel subject matter contained herein which may at any time properly under the United States patent laws be set forth in the claims hereof or originating herein, the elements of any of which claims are intended to include their reasonable equivalents.

I claim:

1. A ceramic block having a back face, polygonal side faces bounding the back face, and border ledges for more than two of the side faces, each border ledge being adjacent a side face and having a portion projecting inwardly over a portion of the back face.

2. A ceramic block having a back face, polygonal side faces bounding the back face, and border ledges for each of the side faces, each border ledge being adjacent a side face and having a portion projecting inwardly over a portion of the back face, each border ledge extending the length of its adjacent side face, and the border ledges being end connected with each other at the corners of the block.

3. A ceramic block having a back face, polygonal side faces bounding the back face, and border ledges, each border ledge being adjacent a side face and having a portion projecting inwardly over a portion of the back face, and a plurality of lugs protruding from the back face, the lugs being spaced from each other and from the border ledges, and each lug having a portion projecting over a portion of the back face.

4. A ceramic block having a back face, polygonal side faces bounding the back face, and border ledges for each of the side faces, each border ledge being adjacent a side face and having a portion projecting inwardly over a portion of the back face, each border ledge extending the length of its adjacent side face, and the border ledges being end connected with each other at the corners of the block, and a plurality of lugs protruding from the back face, the lugs being spaced from each other and from the border ledges, and each lug having a portion projecting over a portion of the back face.

5. A ceramic block having a back face and a plurality of elongated ledges each having a portion projecting inwardly over a portion of the back face, the ledges extending longitudinally cross-wise of the back face and being longitudinally angled with respect to each other.

6. A ceramic block having a back face and a plurality of ledges each having a portion projecting inwardly over a portion of the back face, the ledges extending longitudinally cross-wise of the back face and being longitudinally angled with respect to each other, and the ledges being end connected with each other.

7. A ceramic block having a plurality of spaced lugs each having a portion projecting inwardly over a portion of the back face, the lugs being elongated cross-wise of the back face and being angled with respect to each other.

8. A ceramic block having a back face and a plurality of ledges each having a portion projecting inwardly over a portion of the back face, the ledges extending longitudinally cross-wise of the back face and being longitudinally angled with respect to each other, and a plurality of knobs protruding from the back face, the knobs being spaced from each other and from the ledges, and each knob having a peripheral portion projecting over a portion of the back face.

9. A ceramic block having a back face and a plurality of ledges each having a portion projecting inwardly over a portion of the back face, the ledges extending longitudinally cross-wise of the back face and being longitudinally angled with respect to each other and being end connected with each other, and a plurality of knobs protruding from the back face, the knobs being spaced from each other and from the ledges, and each knob having a peripheral portion projecting over a portion of the back face.

HAROLD R. FEICHTER.